(12) United States Patent
Weiler, Jr.

(10) Patent No.: US 7,213,612 B2
(45) Date of Patent: May 8, 2007

(54) HIGH PRESSURE BALL-POPPET CONTROL VALVE WITH FLOW CONTROL

(75) Inventor: Charles A. Weiler, Jr., Holly, MI (US)

(73) Assignee: Ross Operating Valve Company, Troy, MI (US)

( * ) Notice: Subject to any disclaimer, the term of this patent is extended or adjusted under 35 U.S.C. 154(b) by 175 days.

(21) Appl. No.: 10/141,361

(22) Filed: May 8, 2002

(65) Prior Publication Data
US 2002/0129855 A1 Sep. 19, 2002

Related U.S. Application Data

(63) Continuation-in-part of application No. 09/671,841, filed on Sep. 27, 2000, now Pat. No. 6,431,209, which is a continuation-in-part of application No. 09/527,395, filed on Mar. 16, 2000, now Pat. No. 6,431,207.

(51) Int. Cl.
*F17D 1/00* (2006.01)
(52) U.S. Cl. ............... 137/596.17; 137/596.16; 137/596.18; 137/884; 137/901; 91/454; 91/464
(58) Field of Classification Search ............... 137/602, 137/606, 901, 596, 596.18, 596.16, 596.17, 137/884, 864; 91/464, 454
See application file for complete search history.

(56) References Cited

U.S. PATENT DOCUMENTS

| | | | |
|---|---|---|---|
| 2,503,827 A | 4/1950 | Langmore et al. | |
| 3,038,495 A * | 6/1962 | Fortin | 137/606 |
| 3,884,266 A | 5/1975 | Kondo | |
| 3,934,610 A | 1/1976 | Solie | |
| 4,067,357 A | 1/1978 | Ruchser | |
| 4,111,226 A | 9/1978 | Cameron | |
| 4,754,693 A | 7/1988 | Teltscher | |
| 4,883,091 A | 11/1989 | Weiler et al. | |
| 4,953,593 A * | 9/1990 | Edwards et al. | 137/606 |
| 5,113,907 A | 5/1992 | Russell | |
| 5,454,399 A | 10/1995 | Kazakis et al. | |
| 5,567,023 A | 10/1996 | Yoo | |
| 5,918,631 A | 7/1999 | Weiler, Jr. et al. | |

OTHER PUBLICATIONS

Ross Operating Valve Company product literature, pp. 709-712.

* cited by examiner

*Primary Examiner*—Kevin Lee

(57) ABSTRACT

A control valve for operating a fluid-actuated device includes a fluid inlet, a fluid outlet and a passage in fluid communication between the fluid inlet and the fluid outlet, the passage defining a longitudinal axis. A valve seat is disposed in the passage and includes an upstream diameter and a downstream diameter, the downstream diameter smaller than the upstream diameter. A ball poppet is positionable in a seated line contact position with the valve seat. The valve seat has a valve seat angle relative to a centerline of the longitudinal axis that is greater than an angle formed by the centerline and a line tangent to the ball poppet at the seated line contact position.

27 Claims, 11 Drawing Sheets

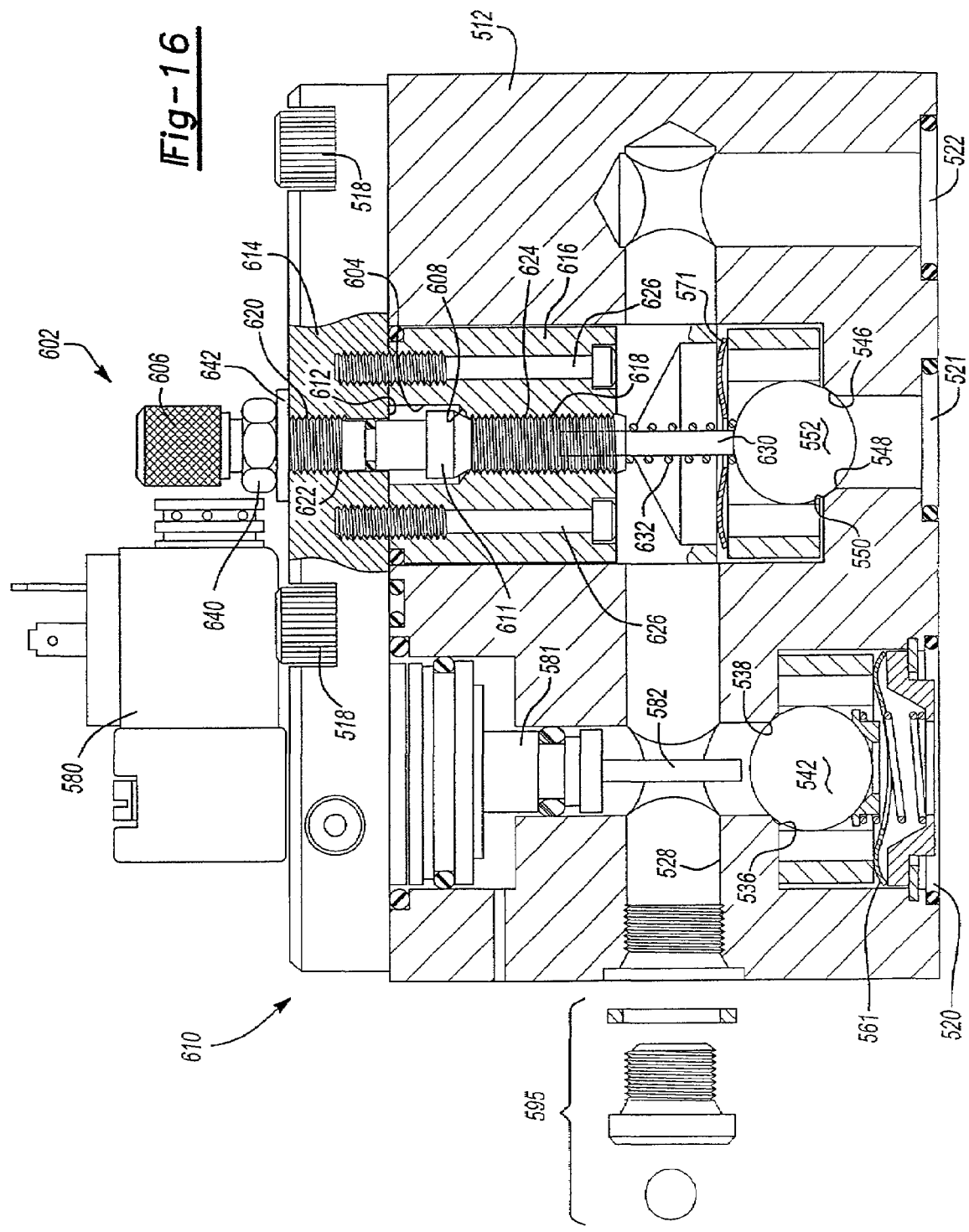

HIGH PRESSURE BALL-POPPET CONTROL VALVE WITH FLOW CONTROL

CROSS-REFERENCE TO RELATED APPLICATIONS

This application is a continuation-in-part of U.S. patent application Ser. No. 09/671,841 filed on Sep. 27, 2000 now U.S. Pat. No. 6,431,209, which is a continuation-in-part of U.S. patent application Ser. No. 09/527,395, filed Mar. 16, 2000 now U.S. Pat. No. 6,431,207. The disclosures of the above applications are incorporated herein by reference.

BACKGROUND AND SUMMARY OF THE INVENTION

The invention relates generally to fluid control valves for operating a fluid-actuating device and, more particularly, to fluid control valves employing one or more ball-poppets.

Fluid control valves are often used for a wide variety of high-pressure applications, such as blow-molding plastic bottles or other such containers. Although these control valves have generally functioned satisfactorily, they often have a short life span due to excessive wear caused by exposure to high fluid pressures and may also experience internal fluid leakage. These internal fluid leaks, such as cross-over leaks, may occur while opening the inlet port of the valve and simultaneously closing the exhaust port of the valve in order to drive the fluid-actuating device. As a result, these factors have contributed to the high operation costs and high maintenance costs of prior art systems.

Moreover, in many commercial applications it is preferable that the control valve be capable of outputting multiple pressures. For example, with regard to blow-molding plastic bottles, it is often desirable to initially introduce a relatively low pressure to the mold in order to introduce the plastic (or other material) into the mold cavity or cavities and then to introduce a relatively high pressure to force or expand the material to conform to the mold cavity.

Accordingly, there exists a need in the relevant art to provide a high-pressure or multi-pressure fluid control valve that is capable of minimizing the wear and internal fluid leakage thereof so as to maximize the useful life of the valve and minimize the associated operating and maintenance costs. Furthermore, there exists a need in the relevant art to provide a fluid control valve that is capable of selectively outputting multiple pressures to the fluid-actuating device.

In accordance with the broad teachings of the present invention, a primary control valve for operating a fluid-actuated device includes a fluid inlet, a fluid outlet and a passage in fluid communication between the fluid inlet and the fluid outlet, the passage defining a longitudinal axis. A valve seat is disposed in the passage and includes an upstream diameter and a downstream diameter. The downstream diameter is smaller than the upstream diameter. A ball poppet is positionable in a seated line contact position with the valve seat. The valve seat has a valve seat angle relative to a centerline of the longitudinal axis that is greater than an angle formed by the centerline and a line tangent to the ball poppet at the seated line contact position.

Each side of the preferred frusto-conical supply valve seat has a supply seat angle relative to the centerline of the supply valve seat that is greater than an angle formed by the centerline of the supply valve seat and a line tangent to the supply ball-poppet at the above-mentioned substantially line-contact when the supply ball-poppet is in its closed position. The included angular relationship of the valve seat angles on both sides of the centerline is preferably approximately ninety degrees. This results in a annular space being formed between the supply valve seat and the spherical supply ball-poppet, which defines a restricted supply flow area upstream of the above-mentioned substantially line-contact as the supply ball-poppet initially moves to its open position and as high-velocity and high-pressure working fluid initially flows downstream past the supply ball-poppet through the smaller-diameter end of the valve seat. This is greatly advantageous because any sonic flow erosion caused by the initial flow of the high velocity and high-pressure working fluid through the annular restricted supply flow area is thus shifted substantially immediately to an upstream surface of the supply valve seat that is adjacent to such annular restricted supply flow area. Most significantly, such upstream surface of the supply valve seat is an area that is not sealingly contacted by the supply ball-poppet. Therefore, this immediate shifting of the sonic damage-susceptible area substantially minimizes sonic erosion of the nearly "knife-edge" smaller-diameter downstream end of the supply valve seat that is substantially line-contacted by the supply ball-poppet. In control valves according to the present invention that have both supply valving and exhaust valving, a similar arrangement is preferably provided in the exhaust passage way in fluid communication for exhaust fluid between the load outlet passage (and load outlet) and the exhaust outlet. As mentioned above, this arrangement is equally applicable to a pressure selector fluid control valve, as described below.

In addition, the present invention preferably includes a generally cylindrical cavity immediately upstream of the larger-diameter upstream ends of the supply and/or exhaust valve seats, with such cavity preferably being larger in diameter than the larger-diameter upstream end of the respective valve seats. A cylindrical poppet guide or ball-poppet guide is located in this enlarged-diameter cavity of the fluid passage, with the ball-poppet guide having a central guide bore extending axially therethrough. A number of circumferentially spaced-apart axially-extending guide fins protrude radially inwardly into the guide bore, with the ball-poppet being received within the guide bore for axial movement within radially inward edges of the guide fins between its open and closed positions. The inner diameter of the above-mentioned cavity is preferably slightly greater than the outer diameter of the ball-poppet guide in order to allow the ball-poppet guide and the ball-poppet to float radially somewhat within the cavity. This allows the generally spherical ball-poppet to be substantially self-centering for sealing line-contact with the smaller-diameter end of the respective supply or exhaust valve seat. Such circumferentially spaced guide fins allow high pressure working fluid to flow therebetween, and the ball-poppet guide substantially minimizes wear on the ball-poppet and/or the valve seat that would result if it were to be allowed to rattle or otherwise move radially in the high-velocity fluid flow. Such a ball-poppet guide can also be used in a selector fluid control valve, as described below.

The present invention substantially also negates cross-over leakage in high-pressure fluid control valves having both supply and exhaust valving by energizing the exhaust ball-poppet actuator, thus closing the exhaust side of the control valve, just prior to energizing the supply ball-poppet actuator, which then opens the supply side and initiates supply flow to the load passage and port.

The above-mentioned ball-poppets (for either primary or selector fluid control valves) are preferably composed of a metallic material, such as a stainless steel, for example, and the above-mentioned ball-poppet guides are preferably composed of a synthetic material, such as nylon, for example. Those skilled in the art will readily recognize that other metallic, synthetic, or non-synthetic materials can also be employed for the ball poppets and/or the ball-poppet guides, depending upon the particular working fluid (pneumatic or liquid) being employed, as well as the particular working fluid pressures involved, as well as depending upon the particular application in which the fluid control valve of the present invention is employed.

The present invention also provides a pressure selector fluid control valve for selectively supplying at least two different working fluid pressures to a fluid-actuated device, either directly or by way of a primary fluid control valve, such as that discussed above. An exemplary selector fluid control valve according to the present invention preferably has a high-pressure inlet in fluid communication with a source of working fluid at a relatively high pressure, a low-pressure inlet in fluid communication with a source of working fluid at a relatively low pressure, and a load fluid outlet passage interconnected in fluid communication with the fluid-actuated device or primary fluid control valve inlet. Such a selector fluid control valve further includes a normally closed high-pressure valve mechanism in fluid communication between the high-pressure inlet and the load fluid outlet passage to selectively allow high-pressure fluid flow from the high-pressure inlet to the load fluid outlet passage, as well as a normally open low-pressure valve mechanism in fluid communication between the low-pressure inlet and the load fluid outlet passage to selectively allow low-pressure fluid flow from the low-pressure inlet to the load fluid outlet passage. A pilot actuator is provided and is selectively operable to force the normally closed high-pressure valve mechanism into an open position and allow said high-pressure fluid flow from the high-pressure inlet to the load fluid outlet passage. This high-pressure fluid being admitted into the load fluid outlet passage forces the normally open low-pressure valve mechanism into a closed position to prevent fluid flow between the low-pressure inlet and the load fluid outlet passage. Thus the selective actuation or energization of the pilot actuator, either the high-pressure or low-pressure working fluid (such as a pneumatic working fluid, for example) can be admitted to the inlet of a fluid-actuated device or the inlet of a primary fluid control valve, such as that described above or of virtually any type.

At least one or preferably both of the above-discussed high-pressure and low-pressure valve mechanisms can include a generally frusto-conical valve seat located in a valve fluid passage in fluid communication with the load fluid outlet passage, with the valve seat having a smaller-diameter downstream end and a larger-diameter upstream end. A generally spherical ball-poppet is selectively movable between respective closed and open positions into and out of substantially ball-poppet line-contact for sealing with said smaller-diameter end of the supply valve seat. The generally spherical ball-poppet preferably has a chord dimension at said line-contact with the smaller-diameter downstream end of the valve seat that is smaller than the larger-diameter upstream end of the valve seat. The generally frusto-conical valve seat preferably has a seat angle relative to the centerline of the supply valve seat that is greater than an angle formed by the centerline of the valve seat and a line tangent to the spherical ball-poppet at the ball-poppet line-contact when the ball-poppet is in said closed position, with such seat angle preferably being approximately forty-five degrees such that the overall seat angle between diametrically opposite portions of the valve seat is approximately ninety degrees. An annular space formed between the valve seat and the spherical ball-poppet thus defines a restricted flow area upstream of the ball-poppet line-contact between the spherical ball-poppet and the smaller-diameter downstream end of the valve seat as the spherical ball-poppet initially moves out of said line-contact to its open position and as the working fluid initially flows downstream past the ball-poppet through the smaller-diameter end of said valve seat. By such an arrangement, any sonic flow erosion caused by the initial working fluid flow past the opening ball-poppet is shifted substantially immediately to an upstream area of the valve seat that is adjacent the restricted flow area and that is not sealingly contacted by the spherical ball-poppet. This substantially minimizes sonic damage to the smaller-diameter downstream end of said valve seat against which the ball-poppet is sealingly engaged when in its closed position. This greatly increases the life of the control valve by minimizing the wear on the sealing portion of the valve seat.

One or both of the fluid valve passages can include a generally cylindrical cavity immediately upstream of the larger-diameter upstream end of the valve seat, the cavity being larger in diameter than the larger-diameter upstream end. The valve mechanism preferably includes a generally cylindrical ball-poppet guide located in the cavity of said fluid passage, with the ball-poppet guide having a central guide bore extending axially therethrough. The ball-poppet guide preferably has a number of circumferentially spaced-apart axially-extending guide fins protruding radially inwardly into the guide bore, with the ball-poppet being received within the guide bore for axial movement within radially inward edges of the guide fins between its open and closed positions. The inner diameter of the cavity is greater than the outer diameter of the ball-poppet guide in order to allow the ball-poppet guide to float radially within the cavity and to allow the spherical ball-poppet to be substantially self-centering for sealing line-contact with the smaller-diameter end of said frusto-conical valve seat.

An exemplary selector fluid control valve according to the present invention may alternatively include a high-pressure inlet in fluid communication with a source of working fluid at a relatively high pressure, a low-pressure inlet in fluid communication with a source of working fluid at a relatively low pressure, and a load fluid outlet passage interconnected in fluid communication with the fluid-actuated device or primary fluid control valve inlet having a selectively adjustable control stem. The control stem selectively adjusts to a plurality of positions including a closed position, a fully open position and a plurality of intermediate positions therebetween for limiting the flow of working fluid through the low pressure inlet.

In any of the primary or pressure selector fluid control valves according to the present invention, the frusto-conical valve seat can alternatively be located in a replaceable valve seat disc that is of a harder material than that of the valve body.

Additional objects, advantages, and features of the present invention will become apparent from the following description and the appended claims, taken in conjunction with the accompanying drawings.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 16 is a cross-sectional illustration of an exemplary dual-pressure selector fluid control valve including an adjustable control stem according to the present invention.

DETAILED DESCRIPTION OF THE PREFERRED EMBODIMENTS

The following description of the preferred embodiment(s) is merely exemplary in nature and is in no way intended to limit the invention, its application, or uses.

Figure 1:
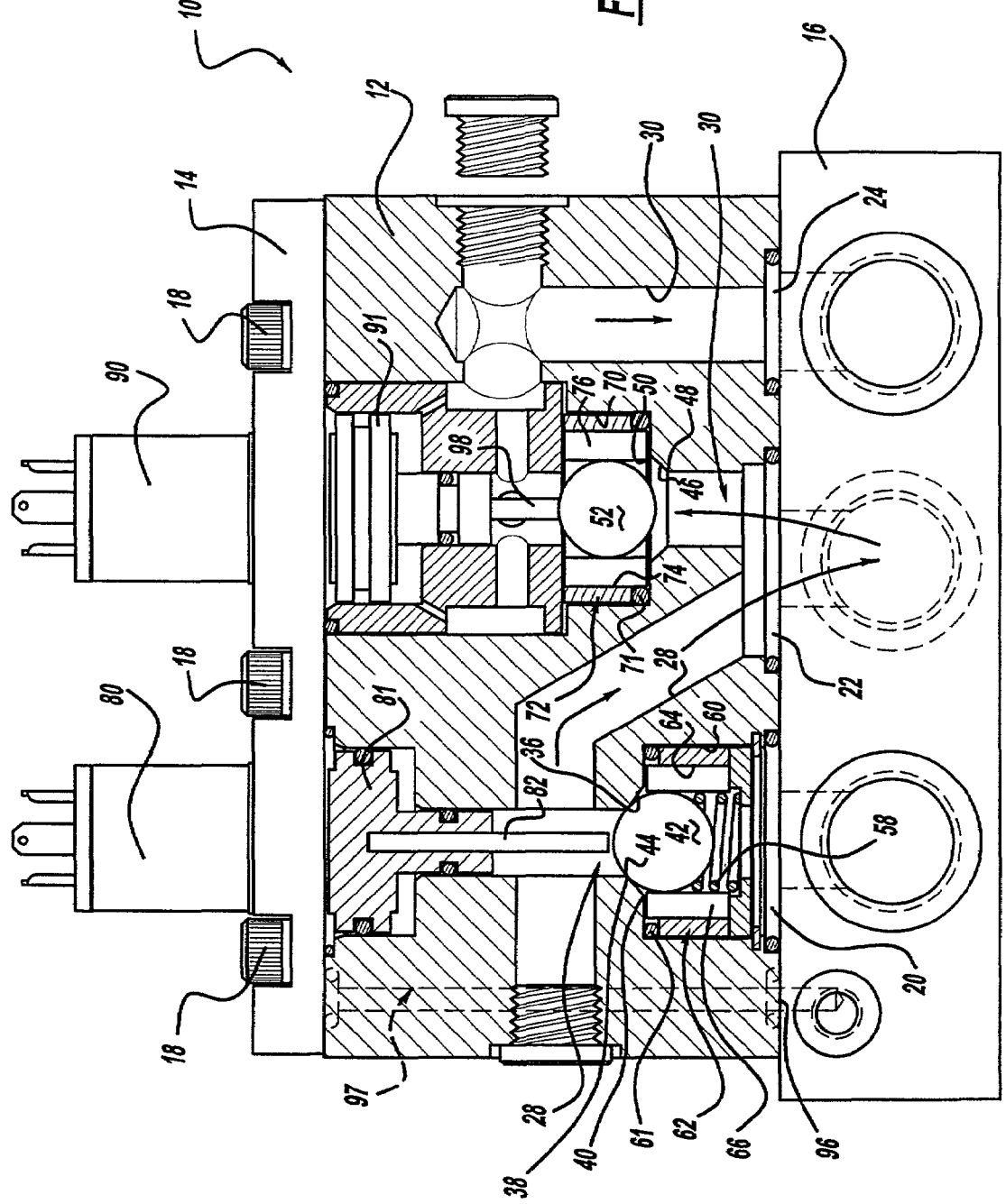
FIG. 1 is a cross-sectional illustration of an exemplary fluid control valve according to the present invention.
Figure 2:
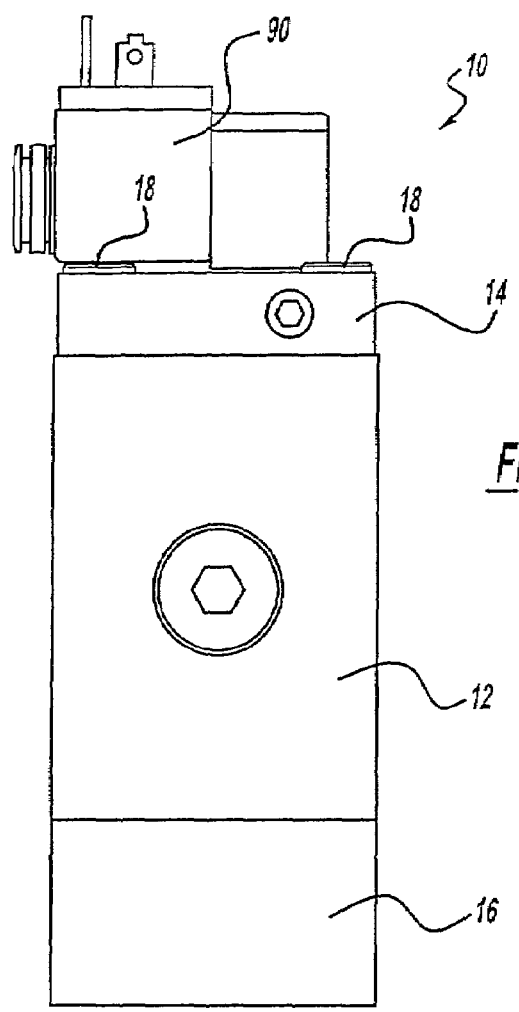
FIG. 2 is an end view of the fluid control valve of FIG. 1.
Figure 3:
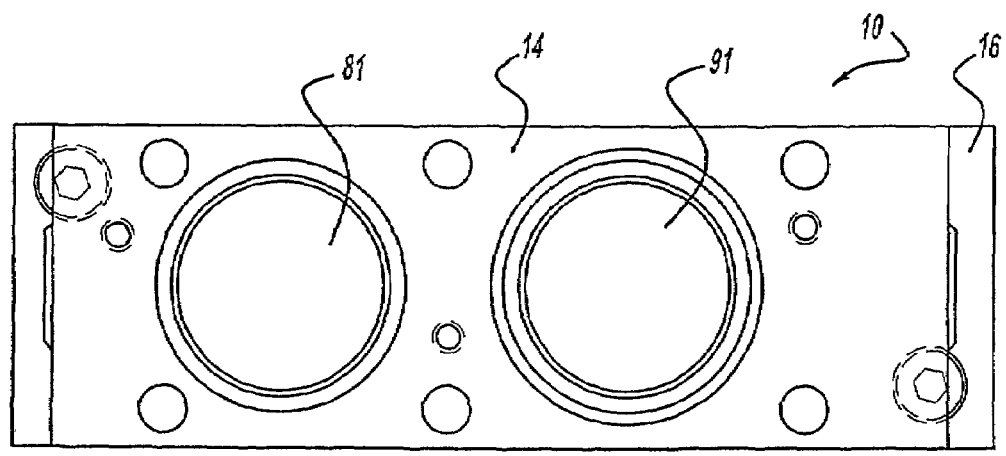
FIG. 3 is a top view of the fluid control valve of FIGS. 1 and 2, with the top cover or cap removed.

Referring to FIG. 1, an exemplary primary fluid control valve 10 is shown having a body 12, a pilot cap 14, and a manifold 16. Body 12 and pilot cap 14 are secured to manifold 16 by way of a number of bolts 18. However, it should be understood that body 12 and pilot cap 14 may be coupled together by way of fluid piping, without the use of the manifold 16, if threaded ports are alternately provided.

The exemplary primary control valve 10 includes an inlet port 20, an outlet or load port 22, and an exhaust port 24. A working fluid supply passage 28 provides working fluid communication from the inlet port 20 to the outlet port 22, which is connected, such as by way of the manifold 16, to a fluid-actuated device. Similarly, an exhaust passage 30 provides exhaust fluid communication between the load port 22 and the exhaust outlet 24.

In the exemplary primary control valve 10, the supply and exhaust passages 28 and 30 respectively include a frusto-conical supply valve seat 36 and a frusto-conical exhaust valve seat 46. The supply valve seat 36 includes a smaller-diameter end 38 and a larger-diameter end 40. Similarly the exhaust valve seat 46 includes a smaller-diameter end 48 and a larger-diameter end 50. A generally spherical supply ball-poppet 42 and a similar generally spherical exhaust ball-poppet 52 are provided for opening and closing movement with respect to their respective frusto-conical supply and exhaust valve seats 36 and 46.

The supply ball-poppet 42 is preferably movably actuated by way of a supply pilot actuator 80, which receives pilot air from a pilot air passage 97, which is in turn connected in fluid communication with a pilot air inlet 96. When the supply pilot actuator 80 is energized, the force of the pilot air is transmitted on to the supply piston 81 and in turn to supply push rod 82 to urge the supply ball-poppet 42 away from the supply valve seat 36, thus opening the supply valving portion of the control valve 10. When the supply pilot actuator 80 is deenergized, the ball-poppet 42 is returned to its closed position under the influence of the inlet fluid pressure and a return spring 58.

Similarly, the exhaust ball-poppet 52 is urged into its closed position with respect to the exhaust valve seat 46 by way of the energization of an exhaust pilot actuator 90. In this regard, pilot actuator 90 acts to exert the force of pilot air on to an exhaust piston 91 and in turn to exhaust push rod 98 in drawing (FIG. 1), to the exhaust ball-poppet 52. Upon deenergization of the exhaust pilot actuator 90, the exhaust ball-poppet 52 is urged back to its open position under the influence of high-pressure working fluid in the exhaust passage 30.

One skilled in the art will readily recognize that actuators other than the exemplary electro-pneumatic supply pilot actuator 80 and electro-pneumatic exhaust pilot actuator 90, can alternatively be employed. Such actuating devices could include for example, electromechanical solenoids, either local or remote, mechanical motion transmitting devices, or a wide variety of other actuating devices well-known to those skilled in the art.

Figure 4:
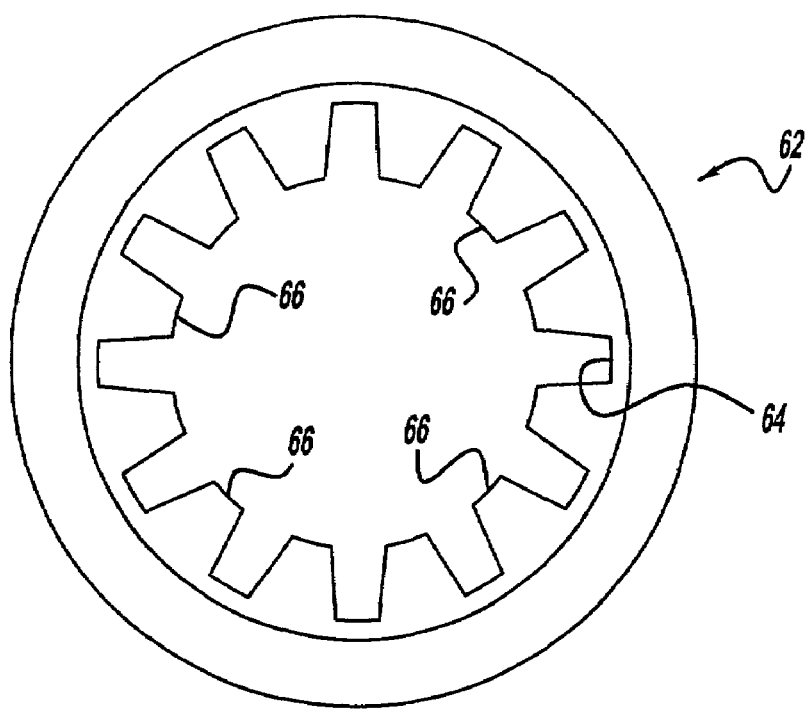
FIG. 4 is a top view of a ball-poppet guide for use with either or both of a supply ball-poppet and an exhaust ball-poppet of the control valve of FIG. 1.
Figure 5:
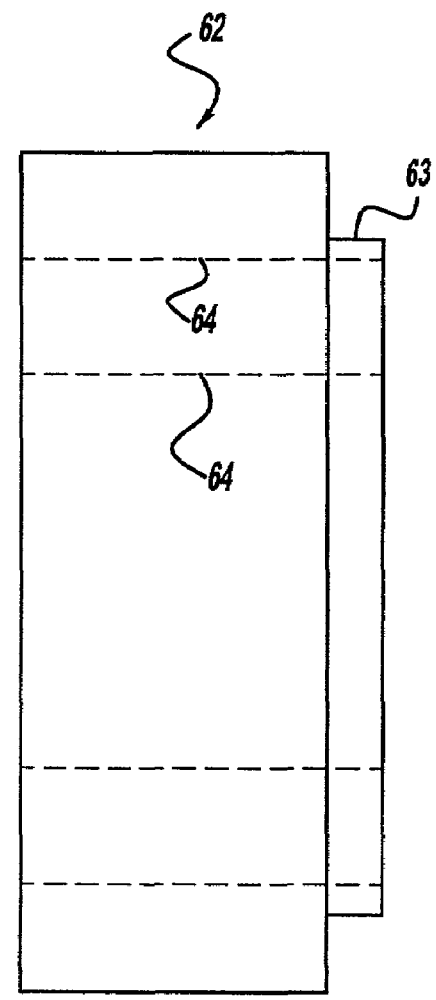
FIG. 5 is a side view of the poppet guide of FIG. 4.
Figure 6:
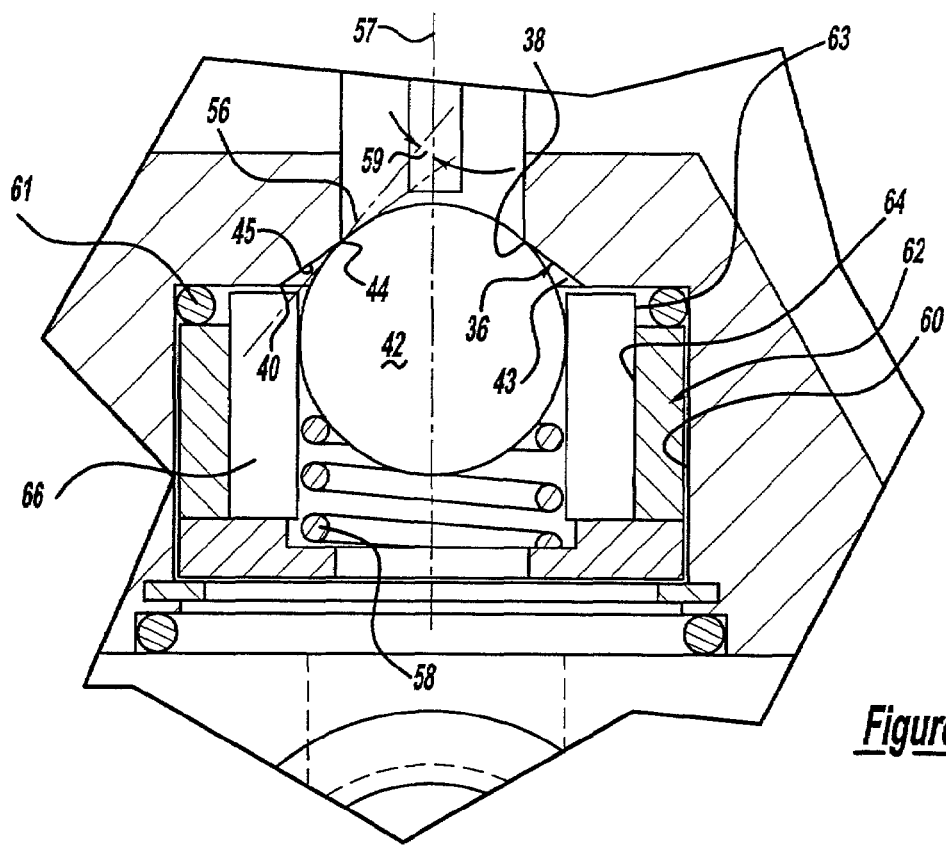
FIG. 6 is an enlarged detail view of the supply valving portion of the control valve of FIG. 1, with the supply ball-poppet shown in its closed position.
Figure 7:
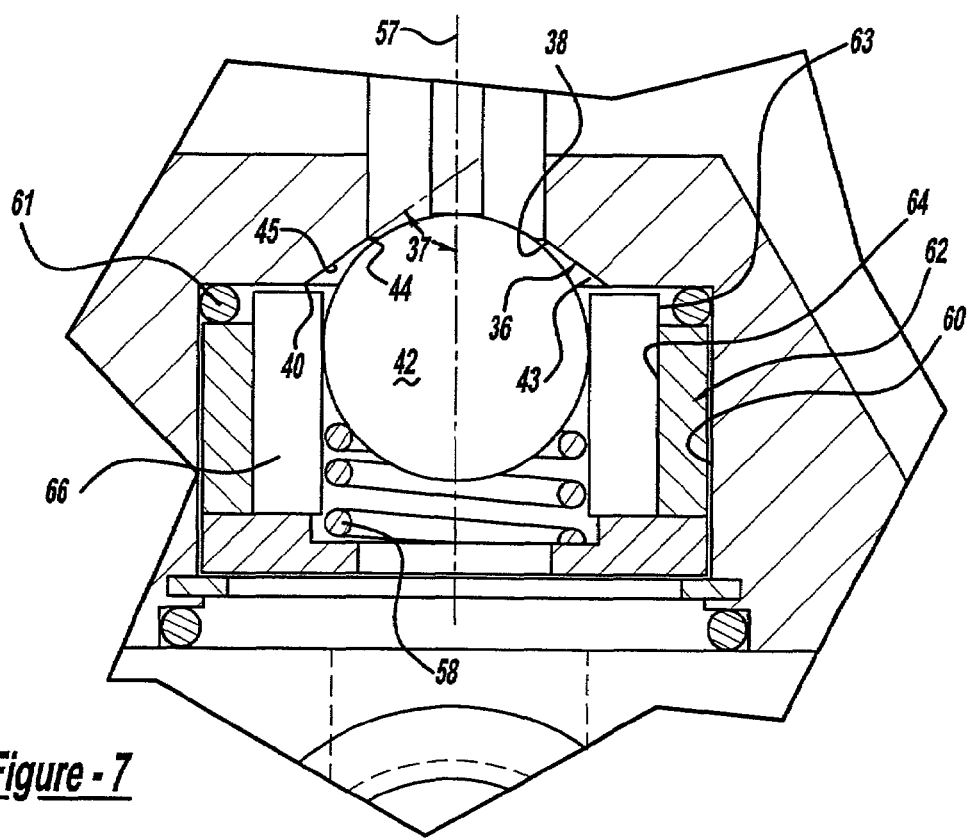
FIG. 7 is an enlarged detailed view similar to that of FIG. 6, but illustrating the supply ball-poppet in its initially opening condition.

Referring primarily to FIGS. 6 and 7, the exemplary high-pressure fluid control valve 10 depicted in the drawings also preferably includes a generally cylindrical supply cavity 60 immediately upstream of the larger-diameter upstream end 40 of the supply valve seat 36. As illustrated in FIGS. 4 through 6, a generally cylindrical supply poppet guide 62 is provided upstream within the preferred diametrically-enlarged cylindrical supply cavity 60. The supply poppet guide 62 includes a generally cylindrical central supply guide bore 64 extending axially therethrough, with a number of circumferentially spaced-apart and axially-extending supply guide fins 66 protruding radially inwardly into the supply guide bore 64. The supply ball-poppet 42 is received within the supply guide bore 64 for axial movement within the radially inward edges of the supply guide fins 66 between its open and closed positions with respect to the supply valve seat 36. As is perhaps best illustrated in FIGS. 6 and 7, the inner diameter of the supply cavity 60 is slightly greater than the outer diameter of the supply ball-poppet guide 62, thus allowing the poppet guide 62 and the ball-poppet 42 to float radially within the supply cavity 60. As such the generally spherical supply ball-poppet 42 is self-centering for sealing substantially line-contact 44 with the smaller-diameter end 38 of the supply valve seat 36.

In addition, the supply guide fins 66 preferably extend axially downstream to form a supply guide fin extension portion 63 on one end of the supply poppet guide 62. A resilient ring 61, such as an O-ring, surrounds the extension portion 63 in order to resiliently urge the poppet guide 62 toward the opposite, upstream end of the supply cavity 60. This action results from compression of the resilient ring 61 between the floor of the supply cavity 60 and the remainder of the supply ball-poppet guide 62.

It should be noted that the above arrangement, as depicted in FIGS. 4 through 7, is substantially typical with respect to the frusto-conical exhaust valve seat 46. Explained further, the smaller-diameter upstream end 48 is arranged to engage in substantial line-contact the generally spherical exhaust poppet 52, all of which are shown in FIG. 1. The supply poppet guide 62 depicted in FIGS. 4 and 5 is also substantially typical for the exhaust poppet guide 72, which is received within the diametrically-enlarged generally cylindrical exhaust cavity 70 and has a similar central exhaust guide bore 74 and similar exhaust guide fins 76, and which can also be seen in FIGS. 1, 8 and 9.

Referring in particular to FIGS. 6 and 7, an enlarged detail view of the supply valving portion of the exemplary control valve 10 is shown. The ball-poppet 42 is shown in its closed position in FIG. 6. Wherein the ball-poppet 42 is sealingly engaged in substantial line-contact 44 with the edge of the smaller-diameter end 38 of the supply valve seat 36. Similarly, the ball-poppet 42 is shown partially opened and thus moved out of such substantial line-contact 44 in FIG. 7. The frusto-conical supply valve seat 36 preferably has a valve seat angle 37 (with respect to the centerline 57 of the valve seat 36) that is slightly larger than the tangent angle 59 of the tangent line 56 to the ball-poppet 42 (with respect to the centerline 57) when the ball-poppet 42 is in substantial line-contact 44 shown in FIG. 6.

This valve seat arrangement results in an annular space 43 that creates a restricted supply flow area just upstream of the supply line-contact 44 and the smaller-diameter end 38. The restricted flow area is created as the supply ball-poppet 42 initially moves out of such line-contact 44 to its open position shown in FIG. 7 as working fluid flows downstream past the ball-poppet 42 through the smaller-diameter end 38 of the supply valve seat 36. Consequently, any sonic flow erosion damage caused by such initial flow of high-pressure working fluid is shifted substantially immediately to an upstream area 45 of the supply valve seat 36. This is highly advantageous in that it shifts such wear or damage caused by such sonic flow erosion to an area of the supply valve seat 36 that is adjacent to the annular space 43 rather than in contact with ball-poppet 42. Accordingly, the sonic damage to the smaller-diameter downstream sealing end 38 of the supply valve seat 36 is minimized. As a result, the damage to and wear of the actual sealing surface of the valve seat 36 on the ball-poppet 42 is likewise substantially minimized and the functional life of the exemplary control valve 10 is correspondingly greatly extended. In this regard, the downtime and the maintenance costs are reduced for a system employing a control valve 10 according to the present invention.

As will be readily recognized by one skilled in the art, the above-described function of the ball-poppet 42 with respect to the supply valve seat 36 as shown in FIG. 6 and FIG. 7 is similar to that of the function and relationship of the exhaust ball-poppet 52 and exhaust valve seat 46.

Figure 8:
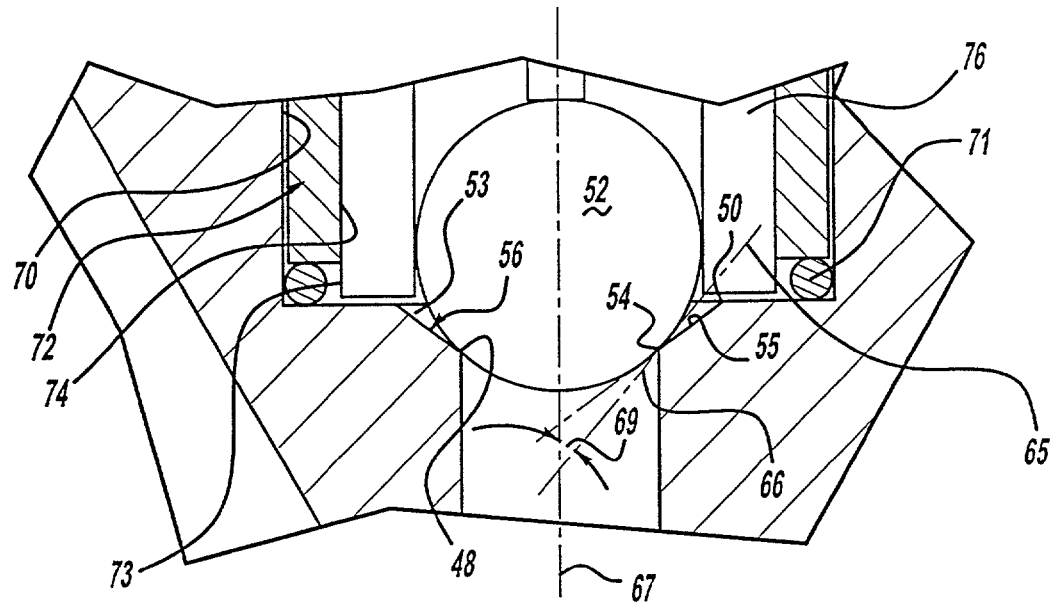
FIG. 8 is an enlarged detail view of the exhaust valving portion of the control valve of FIG. 1, with the exhaust ball-poppet shown in its closed position.
Figure 9:
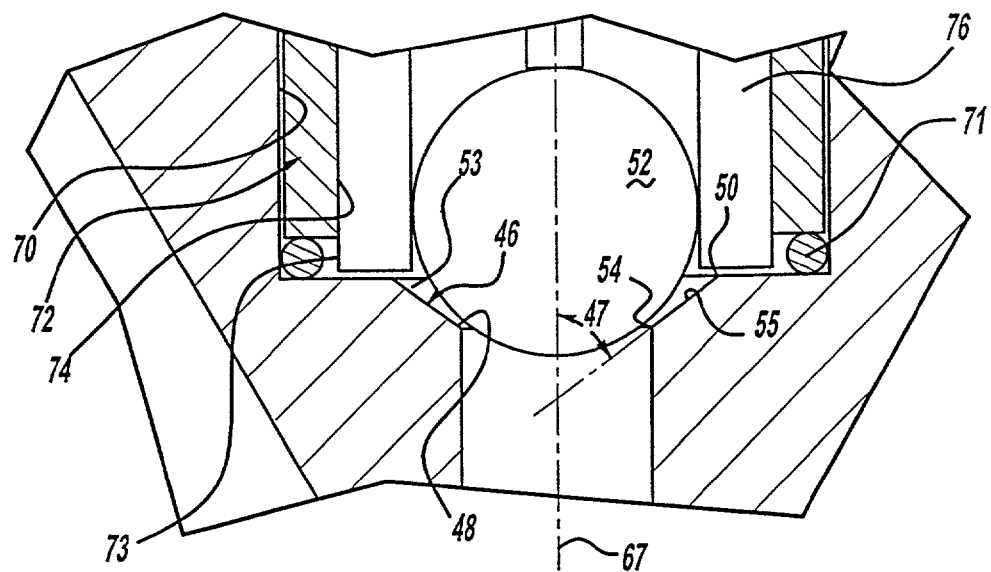
FIG. 9 is an enlarged detail view similar to that of FIG. 8, but illustrating the exhaust ball-poppet in its initially opening condition.

Referring primarily to FIGS. 8 and 9, the exemplary high-pressure fluid control valve 10 depicted in the drawings also preferably includes a generally cylindrical exhaust cavity 70 immediately downstream of the larger-diameter downstream end 50 of the exhaust valve seat 46. A generally cylindrical exhaust poppet guide 72 (similar to that of the supply poppet guide 62 of FIGS. 5 and 6) is provided downstream within the preferred diametrically-enlarged cylindrical exhaust cavity 70. The exhaust poppet guide 72 includes a generally cylindrical central exhaust guide bore 74 extending axially therethrough, with a number of circumferentially spaced-apart and axially-extending exhaust guide fins 76 protruding radially inwardly into the exhaust guide bore 74. The exhaust ball-poppet 52 is received within the exhaust guide bore 74 for axial movement within the radially inward edges of the exhaust guide fins 76 between its open and closed positions with respect to the exhaust valve seat 46. The inner diameter of the exhaust cavity 70 is slightly greater than the outer diameter of the exhaust ball-poppet guide 72, thus allowing the poppet guide 72 and the exhaust ball-poppet 52 to float radially within the exhaust cavity 70. As a result, the generally spherical exhaust ball-poppet 52 is self-centering for sealing substantially line-contact 54 with the smaller-diameter end 48 of the exhaust valve seat 46.

The exhaust guide fins 76 preferably extend axially upstream to form an exhaust guide fin extension portion 73 on the exhaust poppet guide 72. A resilient ring 71, such as an O-ring, surrounds the extension portion 73 in order to urge the poppet guide 72 toward the opposite, downstream end of the exhaust cavity 70. This action results from compression of the resilient ring 71 between the floor of the exhaust cavity 70 and the remainder of the exhaust ball-poppet guide 72.

Referring in particular to FIGS. 8 and 9, an enlarged detail view of the exhaust valving portion of the exemplary control valve 10 is shown. The exhaust ball-poppet 52 is shown in its closed position in FIG. 8 wherein the ball-poppet 52 is sealingly engaged in substantial line-contact 54 with the edge of the smaller-diameter end 48 of the exhaust valve seat 46. Similarly, the ball-poppet 52 is shown partially opened and thus moved out of such substantial line-contact 54 in FIG. 9. The frusto-conical exhaust valve seat 46 preferably has an exhaust valve seat angle 47 (with respect to the exhaust centerline 67 of the valve seat 46) that is slightly larger than the exhaust tangent angle 69 of the exhaust tangent line 65 to the exhaust ball-poppet 52 (with respect to the centerline 67) when the ball-poppet 52 is in substantial line-contact 54 shown in FIG. 8.

This valve seat arrangement results in an annular space 53 that creates a restricted exhaust flow area just downstream of the exhaust line-contact 54 and the smaller-diameter end 48. The restricted flow area is created as the exhaust ball-poppet 52 initially moves out of such line-contact 54 to its initially opening position shown in FIG. 9 as exhaust fluid flows downstream past the ball-poppet 52 through the smaller-diameter end 48 of the exhaust valve seat 46. Consequently, any sonic flow erosion damage caused by such initial flow of high-pressure exhaust fluid is shifted substantially immediately to an upstream flow area adjacent the exhaust valve seat 46. This is highly advantageous in that it shifts such wear or damage caused by such sonic flow erosion to annular space 53 rather than in contact with the ball-poppet 52. Accordingly, the sonic damage to the smaller-diameter upstream sealing end 48 of the exhaust valve seat 46 is minimized. As a result, the damage to and wear of the actual sealing surface of the valve seat 46 on the ball-poppet 52 is likewise substantially minimized and the functional life of the exemplary control valve 10 is correspondingly greatly extended. Valve seat 46 is preferably made of a rigid metal such as but not limited to stainless steel. In this regard, the downtime and the maintenance costs are reduced for a system employing a control valve 10 according to the present invention.

Referring primarily to FIG. 1, the cross-over leakage of the exemplary fluid control valve 10 depicted in the drawings is substantially minimized by energizing the exhaust pilot actuator 90 to close the exhaust ball-poppet 52 just slightly prior to energizing the supply pilot actuator 80 to open the ball-poppet 42. Because of the equipment and energy necessary to elevate the working fluid to such a high-pressure state, minimizing cross over leakage greatly reduces the operating costs that would otherwise result from excessive waste or exhaust of high-pressure working fluid. Such high-pressure working fluid, which can be either pneumatic or hydraulic, but which is preferably pneumatic, is often in the range of 300 psig to 900 psig, and is typically approximately 600 psig in the above-mentioned blow-molding processes.

Finally, either or both of the ball-poppets 42 and 52 are preferably composed of a metallic material, such as stainless steel or other metallic or non-metallic materials deemed advantageous by one skilled in the art for a given application. Similarly, either or both of the supply poppet guide 62 and the exhaust poppet guide 72 are preferably composed of a synthetic material, such as nylon, but can also be composed of a metallic material, such a stainless steel, or other suitable materials known to those skilled in the art.

FIGS. 10 through 15 illustrate various versions of a selector fluid control valve that can be used either alone or in conjunction (on the supply side) with the primary fluid control valve discussed above in connection with FIGS. 1 through 9. Because many of the components of the valves illustrated in FIGS. 10 through 15 are either identical or substantially similar, at least in function, with those of the valves depicted in FIGS. 1 through 9, such components in FIGS. 10 through 15 are indicated by reference numerals that are the same as those in FIGS. 1 through 9, but which have two hundred, three hundred, or four hundred prefixes.

Figure 10:
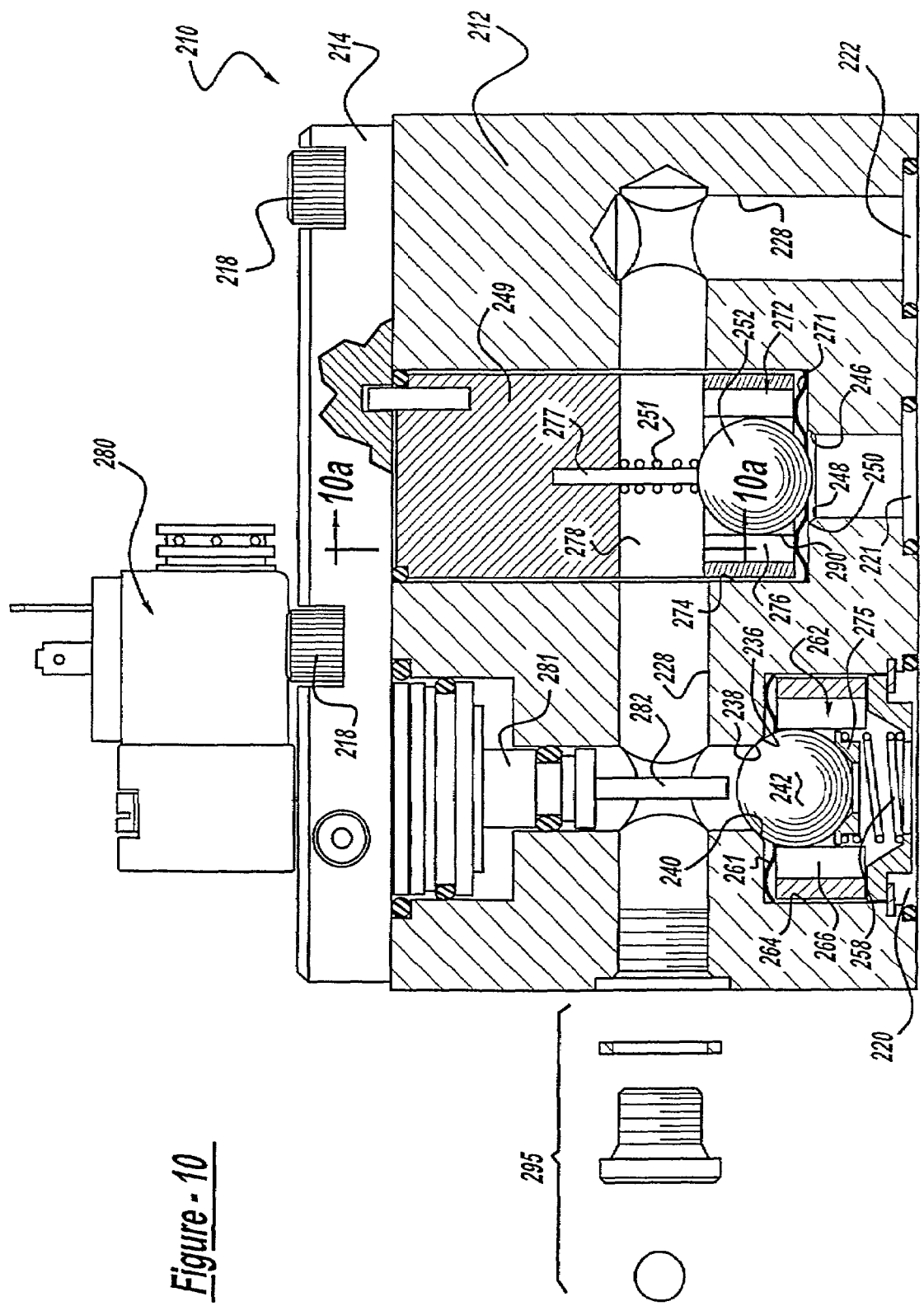
FIG. 10 is a cross-sectional illustration of an exemplary dual-pressure selector fluid control valve according to the present invention.
Figure 12:
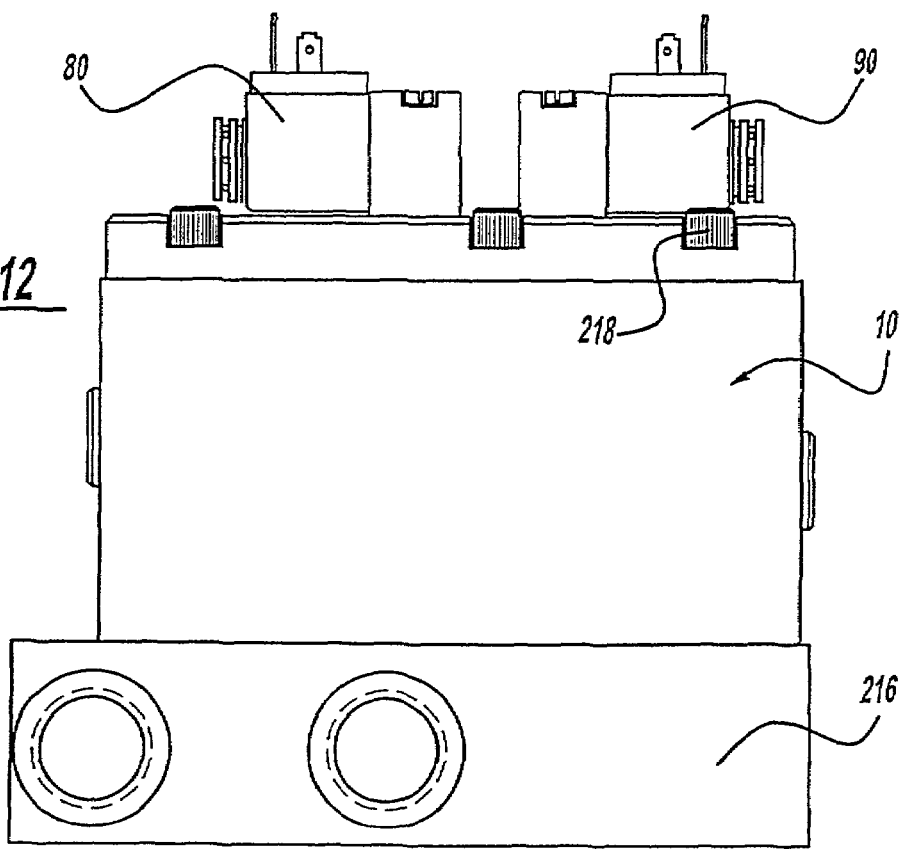
FIG. 12 is a front view of the fluid control valve arrangement of FIG. 11.
Figure 11:
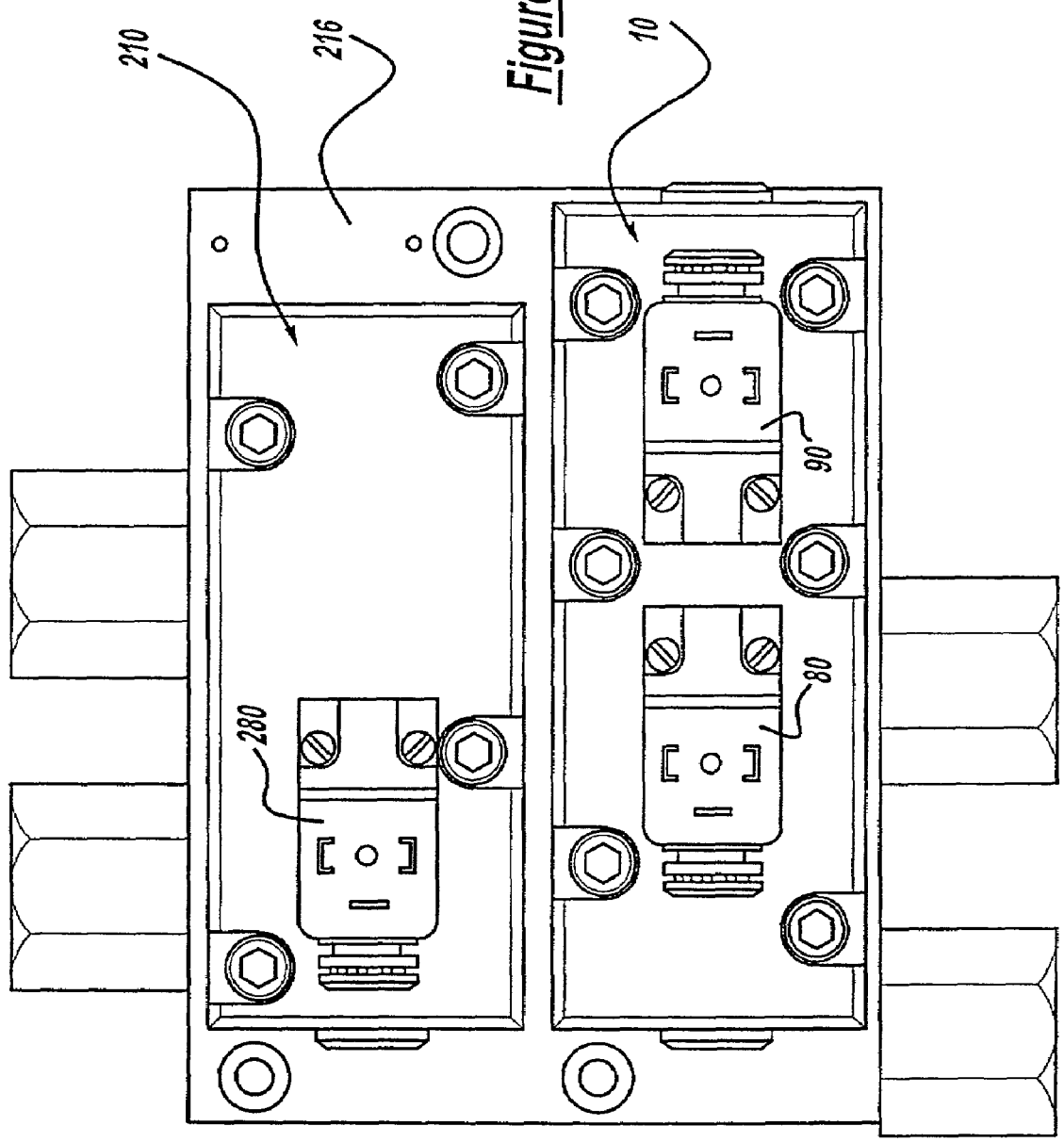
FIG. 11 is a top view of the exemplary dual-pressure selector fluid control valve of FIG. 10, operatively interconnected with a primary fluid control valve, such as is illustrated in FIGS. 1 through 9, both of which being mounted on a fluid manifold.
Figure 13:
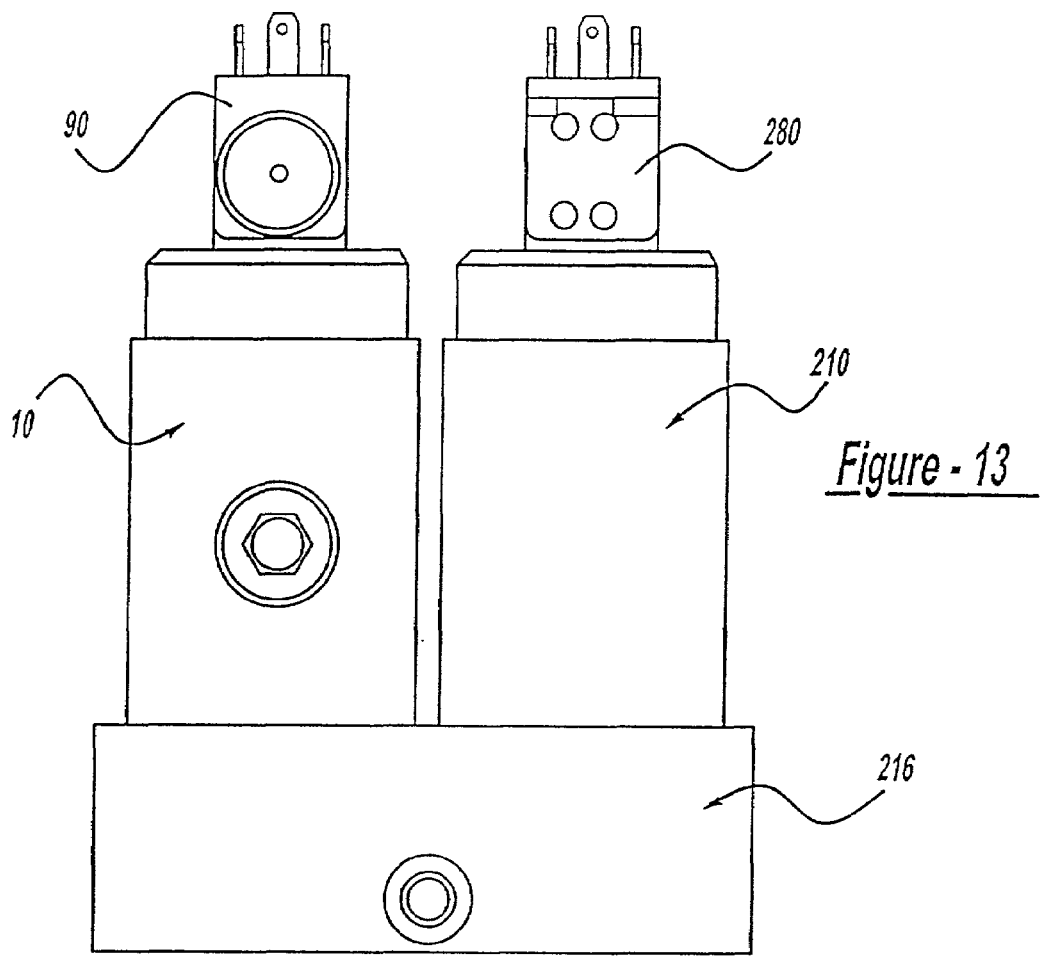
FIG. 13 is an end view of the fluid control valve arrangement of FIGS. 11 and 12.

In FIGS. 10 through 13, an exemplary selector fluid control valve 210 includes a body 212, a pilot cap 214, and a manifold 216 (as shown in FIGS. 11 through 13). Body 212 and pilot cap 214 are secured to manifold 216 in a manner similar to that depicted above in connection with FIGS. 1 through 9. However, it should be understood that body 212 and pilot cap 214 may be coupled together by way of fluid piping, without the use of manifold 216, if threaded ports are alternatively provided.

The exemplary selector fluid control valve 210 includes an inlet port 220 and 221, which are in fluid communication with separate sources of working fluid. Inlet port 220 is configured for communicating with fluid at a relatively higher pressure whereas inlet port 221 is configured for communicating with fluid at a relatively lower pressure. Such relatively higher pressures will be referred to herein as "high-pressure", and such relatively lower pressures will similarly be referred to as "low-pressure". It should be appreciated that the inlet and outlet ports described herein may alternatively be threaded.

A load fluid outlet passage 228 extends through the body 212 of the selector fluid control valve 210 and is in fluid communication with an outlet load port 222. The selector fluid control valve 210 can be used either alone, or in combination with a primary fluid control valve, such as the primary fluid control valve 10 of FIGS. 1 through 9. In such an application, the selector fluid control valve 210 can have its load outlet port 222 interconnected in fluid communication with the inlet port 20 of the primary fluid control valve 10, either by fluid piping or by way of the manifold 216 of FIG. 11.

The selector fluid control valve 210 also includes a normally closed high-pressure valve mechanism in fluid communication between the high pressure inlet port 220 and the load fluid outlet passage 228. Similarly, a normally open low-pressure valve mechanism is in fluid communication between the low-pressure inlet port 221 and the load fluid outlet passage 228. In the exemplary selector fluid control valve 210, the high-pressure valve mechanism includes a frusto-conical valve seat 236, which in turn includes a smaller-diameter end 238 and a larger-diameter end 240. A ball-poppet 242, which is preferably generally spherical in shape and configuration, engages the valve seat 236 in a substantially line-contact engagement, in a manner as previously explained in more detail in connection with the valve seat 36 and the ball-poppet 42 of FIGS. 1 through 9. Similarly, the low-pressure valve mechanism includes a valve seat 246 having a smaller-diameter end 248 and a larger-diameter end 250, with the low-pressure ball-poppet 252 engaging the small-diameter end 248 in the same type of line-contact as is discussed above.

The high-pressure ball-poppet 242 is received within a high-pressure ball-poppet guide 262 similar to the ball-poppet guide 62 of FIGS. 1 through 9. In a similar manner, the low-pressure ball-poppet 252 is received within a low-pressure ball-poppet guide 272. The guides 262 and 272 maintain the radially-floating and ball-poppet centering capabilities, associated with the guides 62 and 72 of FIGS. 1 through 9. In contrast however, the fins 266 and 276 do not necessarily extend axially beyond the end of their respective guides 262 and 272 as with the fins 66 and 76 from the above-discussed guider 62 and 72. In such an arrangement, instead of the O-rings 61 and 71 of FIGS. 1 through 9, resilient wavy washers or spring wave washers 261 and 271 are provided to resiliently bias the respective guides 262 and 272 toward their respective proper positions within the respective guide bores 264 and 274. In substantially all other respects, however, the ball-poppet guides 262 and 272 perform in a substantially identical manner as the corresponding ball-poppet guides 62 and 72 discussed above.

In the preferred selector fluid control valve 210, the high-pressure ball-poppet 242 is biased toward its normally closed position by a return spring 258 acting on the ball-poppet 242 by way of a ball-poppet perch 275. A pilot actuator 280 is provided in connection with the high-pressure ball-poppet 242 and is selectively actuable to force the ball-poppet 242 off of its respective valve seat 236 and into its open position, with the pilot actuator 280 acting through the high-pressure actuating piston assembly 281 and the push rod 282.

Figure 10A:
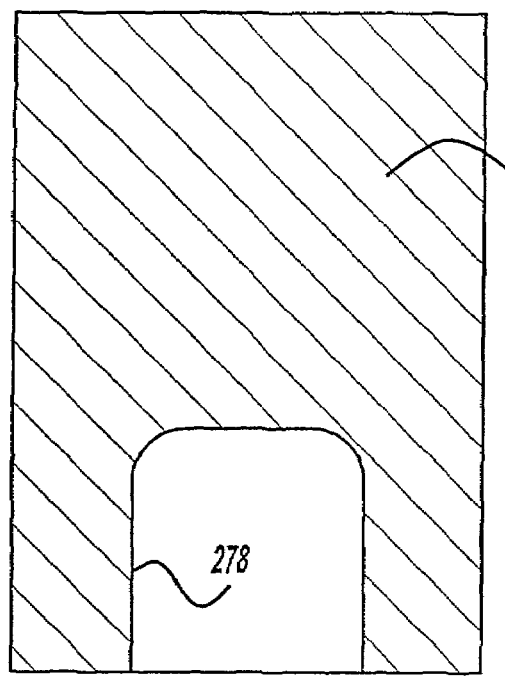
FIG. 10a is a cross-sectional view taken generally along line 10a—10a of FIG. 10.

In the low-pressure valve mechanism, the ball-poppet 252 is in a normally-open position under the influence of the low-pressure working fluid from the low-pressure inlet 221 acting on the ball-poppet 252 and against the biasing force of a low-force retaining spring 251. The low-pressure ball-poppet 252 is held in place by a retainer plug 249 having a generally U-shaped opening 278 extending therethrough, as is illustrated in FIG. 10a. The opening travel of the low-pressure ball-poppet 252 is limited by its contact with a stop rod or pin 277 fixedly interconnected with the retainer plug 249 and extending into the retainer plug passage 278.

In operation, the selector fluid control valve 210 can be used to selectively supply one of two different pressures of working fluid (preferably a pneumatic working fluid) to either a fluid-actuated device or to the inlet of a primary control valve (such as the primary fluid control valve 10 discussed above) by way of the outlet load port 222 of the selector fluid control valve 210. Initially, a source of relatively low-pressure working fluid is supplied to the low-pressure inlet port 221 and passes by the normally-open ball-poppet 252 to the load fluid outlet passage 228 and the outlet load port 222. Such relatively low-pressure working fluid exerts sufficient force on the low-pressure ball-poppet 252 to maintain it in its open position against the biasing force of the low-pressure retaining spring 251 as long as fluid is flowing in the circuit. Thus, in this condition, as is illustrated in FIG. 10, relatively high-pressure working fluid supplied to the high-pressure inlet port 220 is isolated from the relatively low-pressure working fluid in the load fluid outlet passage 228 by the normally closed high-pressure ball-poppet 242. The normally closed high-pressure ball poppet is forced against its respective valve seat 236 under the influence of the return spring 258. In this condition, such relatively low-pressure working fluid is supplied to the outlet load port 222.

However, when it is desired to admit relatively high-pressure working fluid to the load fluid outlet passage 228 and to the outlet load port 222, the pilot actuator 280 is selectively energized. It should be noted that the pilot actuator 280 can be pneumatically operated, electrically operated, or mechanically operated, for example.

The energization of the pilot operator 280 causes the piston assembly 281 and the push rod 282 to force the high-pressure ball-poppet 242 to its open position against the biasing force of the return spring 258 and the high-pressure fluid in the inlet 220. This opening of the high-pressure ball-poppet 242 allows relatively high-pressure working fluid from the high-pressure inlet port 220 to pass into the load fluid outlet passage 228. The high-pressure working fluid now admitted into the load fluid outlet passage 228 acts (in conjunction with the low-force retaining spring 251) to urge the normally open low-pressure ball-poppet 252 to its closed position in sealing engagement with the valve seat 246. Thus, in this condition, the relatively low-pressure working fluid from the low-pressure inlet port 221 is isolated from the relatively high-pressure working fluid in the load fluid outlet passage 228, the retainer plug passage 278, and the outlet load port 222. As mentioned above, this allows for selective supply of either the relatively low-pressure working fluid or the relatively high-pressure working fluid from the outlet load port 222 to a fluid actuated device or to the inlet 20 of a primary valve such as that of the primary control valve 10 illustrated in FIGS. 1 through 9. This latter arrangement is illustrated in FIGS. 11 through 13 where the selector fluid control valve 210 and the primary control valve 10 are mounted together on a manifold 216. Again manifold 216 may alternately be replaced by separate fluid piping if alternate threaded ports are provided.

Figure 14:
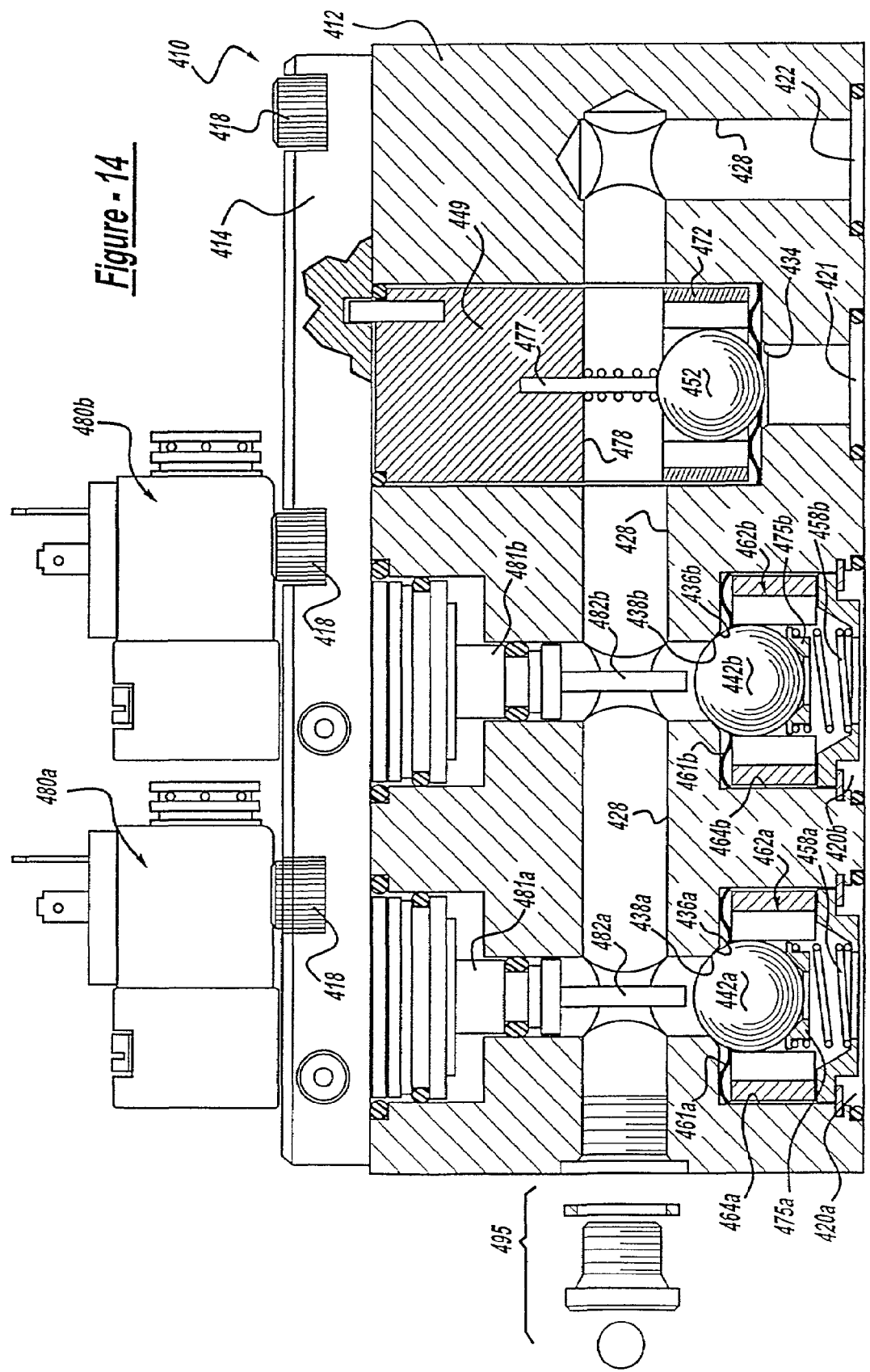
FIG. 14 is a cross-sectional illustration of an exemplary pressure selector fluid control valve similar to that of FIG. 10, but showing an alternate tri-pressure version of the selector fluid control valve.

In FIG. 14, an alternate embodiment of a selector fluid control valve according to the present invention is depicted for purposes of illustrating that the present invention is equally applicable to such control valves adapted for supplying more than two different working fluid pressures to a fluid-actuated device, either directly or through a primary fluid control valve, such as the primary fluid control valve 10 discussed above and shown in FIGS. 1 through 9. The selector fluid control valve 410 in FIG. 14 has numerous components that are either identical or functionally substantially similar to those of the fluid selector control valve 210 in FIG. 10. In FIG. 14, however, such corresponding components are indicated by reference numerals having four-hundred prefixes and a or b suffixes in the case of components that are identical with each other.

The body 412 of the selector fluid control valve 410 includes two of the above-discussed high-pressure inlets 420a and 420b, with two of the above-described pilot actuators 480a and 480b, each of which are separately and selectively operable to urge their respective ball-poppets 442a and 442b into their respective open positions. In virtually all other respects, however, the selector fluid control valve 410 operates in substantially the same manner as the above-described selector fluid control valve 210.

The operational difference between the selector fluid control valve 410 and the selector fluid control valve 210 is that the pilot actuators 480a and 480b can be separately and selectively actuated or energized, or de-actuated or de-energized, in order to allow for the selective supply of three different pressures or working fluid to the fluid-actuated device, by way of the load outlet port 422, either directly or by way of the above-mentioned primary fluid control valve. It should be noted that FIG. 14 illustrates merely an exemplary multi-pressure application of the present invention, and one skilled in the art will now readily recognize that any number of different pressures can be accommodated by the selector fluid control valve of the present invention.

Figure 15:
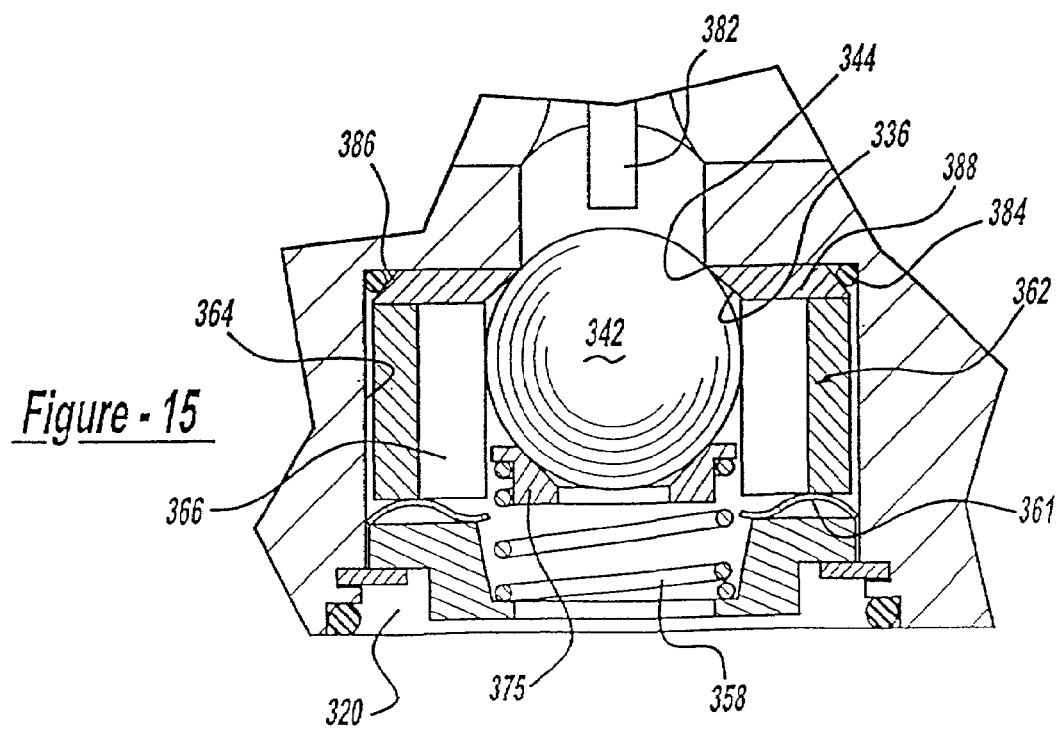
FIG. 15 is an enlarged detailed view of an alternate version of the ball-poppet portion of a control valve according to the invention, having a replaceable valve seat disc and which is applicable to any of the fluid control valves of FIGS. 1 through 14.

In FIG. 15, still another alternate arrangement of the present invention is depicted, in which the resilient spring wave washer 361 is moved to an opposite position with respect to the ball-poppet guide than that depicted in FIG. 10. In this arrangement, a replaceable valve seat disc 388, which includes the valve seat 336 therein, is trapped between the ball-poppet guide 362 and the downstream end of the guide bore 364. The valve seat disc 388 includes a chamfered edge 386 that is sealingly engaged by an O-ring 384 and is preferably composed of a harder material than that of the valve body. Such an arrangement allows for convenient replacement of a worn valve seat 336 by merely replacing the valve seat disc 388, without the necessity of discarding or re-machining the valve seat 236 of the body 212 in FIG. 10. Thus, one selector fluid control valve can be partially disassembled and repaired by such replacement of the valve seat disc 388 while another selector fluid control valve is in service. Such repaired selector fluid control valve can then be maintained in reserve for immediate replacement of a worn selector fluid control valve that is currently in service. It should be noted that a similar replaceable valve seat disc can also alternatively be used in conjunction with any of the valve mechanisms or arrangements shown in FIGS. 1 through 15.

Finally, the preferred pneumatic high-pressure working fluid or fluids can be at virtually any pressure above that of the low-pressure working fluid, such as, for example, pressures in the range of 300 psig to 900 psig, with one application requiring a high-pressure working fluid at approximately 600 psig. Similarly, the low-pressure working fluid can be at virtually any pressure lower than that of the high-pressure working fluid, such as, for example, pressures in the range of 10 psig to 300 psig, with at least one application requiring such low-pressure working fluid at a pressure of approximately 100 psig. Furthermore, as mentioned above, the primary fluid control valves and the selector control valves of the present invention have wide-ranging applicability in various liquid or pneumatic fluid control or actuation systems. One example of such an application is a pneumatic system for blow molding of plastic bottles or other containers, which requires a first relatively lower pressure to urge the plastic material into the mold cavity, followed by a relatively higher pressure working fluid to complete the blow molding process by forcing the plastic material against the internal contours of the mold. One skilled in the art will readily recognize, however, that this is merely one example of the many applications of the present invention.

Turning now to FIG. 16, an alternate embodiment of the selector fluid control valve according to the present invention is shown. The selector fluid control valve 610 in FIG. 16 has numerous components that are either identical or functionally substantially similar to those of the fluid selector control valve 210 in FIG. 10. In FIG. 16, however, such corresponding components are indicated by reference numerals having five-hundred prefixes in the case of components that are identical with each other. Furthermore, components corresponding to selector valve 610 incorporating adjustment stem 602 are referenced with numerals having a six-hundred prefix.

The body 512 of the selector fluid control valve 510 includes the above-discussed high-pressure inlet 520, with the above-described pilot actuator 580 which is selectively operable to urge ball-poppet 542 into its respective open position. It is noted that wave springs 561 and 571 have been relocated to opposite sides of ball-poppets 542 and 552. In addition, as will be explained in greater detail later, the normally-open low-pressure ball poppet 552 cooperates with fluid control adjustment stem 602. In virtually all other respects, however, the selector fluid control valve 610 operates in substantially the same manner as the above-described selector fluid control valve 210.

With continued reference to FIG. 16, fluid control adjustment stem 602 is selectively linearly actuated through bore 604 upon rotation of flow control knob 606. In this regard, the linear travel of adjustment stem 602 is restricted between surfaces 608 and 612 by collar 611. Threads 624 are incorporated in plug 616 for cooperating with complimentary threads 618 on adjustment stem 602. Fasteners 626 threadably secure plug 616 to pilot cap 614. A jam nut 640 and washer 642 are positioned between control knob 606 and pilot cap 614. Jam nut 640 engages threads 622 to lock stem 602 to pilot cap 614. Pin or engagement portion 630 extends from a distal end of adjustment stem 602 for engaging ball poppet 552 and limiting the allowable displacement thereof. A return spring 632 is incorporated around pin 630.

The operation of adjustment stem 602 will now be described in greater detail. The flow rate allowed around ball poppet 552 is determined by the displacement of ball poppet 552 from valve seat 546. In this regard, the flow rate is increased as ball poppet 552 moves away from valve seat 546. The allowable displacement of ball poppet 552 from valve seat 546 is controlled by the location of pin 630 extending from adjustment stem 602. Explained further, fluid flow through low-pressure inlet port 521 urges ball poppet 552 away from valve seat 546 into contact with pin 630. In this manner, the adjustment stem 602 may be positioned at a predetermined location to obtain a desired flow rate around ball poppet 552. Once a desired flow rate is reached, jam nut 640 may be advanced into engagement with pilot cap 614 to preclude inadvertent rotation of control knob 606.

The foregoing discussion discloses and describes merely exemplary embodiments of the present invention for purposes of illustration only. One skilled in the art will readily recognize from such discussion, and from the accompanying drawings and claims, that various changes, modifications, and variations can be made therein without departing from the spirit and scope of the invention as defined in the following claims.

What is claimed is:

1. A control valve comprising:
a first fluid inlet at a first pressure;
a second fluid inlet at a second pressure;
an outlet passage fluidly connectable with a fluid-actuated device;
a first valve mechanism in fluid communication between said first inlet and said outlet passage;
a second valve mechanism in fluid communication between said second inlet and said outlet passage, said second valve mechanism moveable between a closed position, wherein said working fluid is precluded from flowing therethrough, a fully opened position, wherein said working fluid is permitted to flow therethrough, and a plurality of intermediate positions; and
a control stem operably coupled to said second valve mechanism, said control stem being selectively adjustable to a plurality of positions for actuating said second valve mechanism into said closed position, said fully opened position, and said plurality of intermediate positions, thereby limiting the flow of working fluid through said second valve mechanism,
wherein at least one of said first and second valve mechanisms include a generally spherical ball-poppet selectively movable between said closed and fully opened positions.

2. The control valve of claim 1 wherein said control stem includes a longitudinal body portion having an adjustment portion incorporated on a proximal end and an engagement portion incorporated on a distal end, said engagement portion selectively advancing toward said ball poppet upon adjustment of said adjustment portion toward said closed position, said engagement portion withdrawing from said ball poppet upon adjustment of said adjustment portion toward fully open position.

3. The control valve according to claim 2 wherein at least one of said first and second valve mechanisms include a valve seat located in a valve fluid passage in fluid communication with said outlet passage, said valve seat having a smaller-diameter end and a larger-diameter end, and a generally spherical ball-poppet being engageable with said valve seat at a contact point thereon in said closed position for sealing with said smaller-diameter end of said valve seat, said generally spherical ball-poppet having a chord dimension at said contact point with said smaller-diameter end of said valve seat that is smaller than said larger-diameter end of said valve seat, said valve seat having a seat angle relative to the centerline of said valve seat and a line tangent to said spherical ball-poppet at said contact point when said ball-poppet is in said closed position.

4. The control valve according to claim 3, further comprising:
an annular space formed between said valve seat and said spherical ball-poppet defining a restricted flow area adjacent said contact point between said spherical ball-poppet and said smaller-diameter end of said valve seat as said spherical ball-poppet initially moves away from said contact point to its open position and as said working fluid initially flows past said ball-poppet, any sonic flow erosion caused by said initial working fluid flow thereby being shifted substantially immediately to an upstream flow area that is adjacent said contact point and that is not sealingly contacted by said spherical ball-poppet thus substantially minimizing sonic damage to said smaller-diameter end of said valve seat.

5. The control valve of claim 4 wherein said engagement portion of said control stem limits travel of said ball poppet to a predetermined location offset from said valve seat.

6. The control valve of claim 1 wherein said working fluid is flow adjustable through said low pressure valve mechanism between the range of 10 to 300 psig.

7. The control valve of claim 1 wherein said ball poppet is composed of a metallic material.

8. The control valve of claim 7 wherein said metallic material includes stainless steel.

9. A control valve according to claim 3 wherein said outlet passage includes a generally cylindrical cavity immediately adjacent to said larger-diameter end of said valve seat, said cavity being larger in diameter than said larger-diameter end, at least one of said first and second valve mechanism further including a poppet guide located in said cavity of said fluid passage, said poppet guide having a guide bore extending axially therethrough, said poppet guide having a plurality of axially-extending guide fins protruding radially inward into said guide bore, said ball-poppet being received within said guide bore for axial movement within radially inward edges of said guide fins between said opened position and said closed position, the inner diameter of said cavity being greater than the outer diameter of said poppet guide in order to allow said poppet guide to float radially within said cavity and to allow said spherical ball-poppet to be substantially self-centering in said cylindrical cavity for seating with said valve seat.

10. A control valve comprising:
a first fluid inlet at a first pressure;
a second fluid inlet at a second pressure, said first pressure being higher than said second pressure;
an outlet passage fluidly connectable with a fluid-actuated device;
a first valve mechanism in fluid communication between said first inlet and said outlet passage;
a second valve mechanism in fluid communication between said second inlet and said outlet passage, said second valve mechanism including a generally spherical ball poppet moveable between a closed position, wherein a working fluid is precluded from flowing therethrough, a fully opened position, wherein said working fluid is permitted to flow therethrough and a plurality of intermediate positions; and
a control stem operably coupled to said second valve mechanism said control stem being selectively adjustable to a plurality of positions offset from said ball poppet for engaging said ball poppet and limiting movement thereof at a plurality of positions including said closed position, said fully opened position and said plurality of intermediate positions.

11. The control valve of claim 10 wherein said control stem includes a longitudinal body portion having an adjustment portion incorporated on a proximal end and an engagement portion incorporated on a distal end, said engagement portion selectively advancing toward said ball poppet upon adjustment of said adjustment portion toward said closed position, said engagement portion withdrawing from said ball poppet upon adjustment of said adjustment portion toward said fully opened position.

12. The control valve according to claim 10 wherein at least one of said first and second valve mechanism includes a valve seat located in a valve fluid passage in fluid communication with said outlet passage, said valve seat having a smaller-diameter end and a larger-diameter end, and a generally spherical ball-poppet being engageable with said valve seat at a contact point thereon in said closed position for sealing with said smaller-diameter end of said valve seat, said generally spherical ball-poppet having a chord dimension at said contact point with said smaller-diameter end of said valve seat that is smaller than said larger-diameter end of said valve seat, said valve seat having a seat angle relative to the centerline of said valve seat that is greater than an angle formed by the centerline of said valve seat and a line tangent to said spherical ball-poppet at said contact point when said ball-poppet is in said closed position.

13. The control valve according to claim 12 further comprising:
an annular space formed between said valve seat and said spherical ball-poppet defining a restricted flow area adjacent said contact point between said spherical ball-poppet and said smaller-diameter end of said valve seat as said spherical ball-poppet initially moves away from said contact point to its open position and as said working fluid initially flows past said ball-poppet, any sonic flow erosion caused by said initial working fluid flow thereby being shifted substantially immediately to an upstream flow area that is adjacent said contact point and that is not sealingly contacted by said spherical ball-poppet thus substantially minimizing sonic damage to said smaller-diameter end of said valve seat.

14. The control valve of claim 10 wherein said working fluid is flow adjustable through said second valve mechanism between the range of 10 to 300 psig.

15. A control valve for operating a fluid-actuated device, said control valve comprising:
an inlet in fluid communication with a source of pressurized working fluid;
a load outlet in fluid communication with said fluid-actuated device;
a fluid supply passage providing fluid communication for said working fluid from said inlet to said outlet;
a supply valve seat located in said fluid supply passage;
a generally spherical supply poppet being selectively movable between respective supply closed and supply open positions into and out of sealing contact with said supply valve seat;
an exhaust outlet;
a fluid exhaust passage in fluid communication for exhaust fluid between said load outlet and said exhaust outlet
an exhaust valve seat located in said fluid exhaust passage; and
a generally spherical exhaust poppet being selectively movable between respective exhaust closed and exhaust open positions into and out of sealing contact with said valve seat, said control valve further including a supply pilot actuator and an exhaust pilot actuator, said supply pilot actuator being selectively energizable to move said supply poppet away from said supply valve seat to said supply open position, said exhaust pilot actuator being selectively energizable to move said exhaust poppet toward said exhaust valve seat to said exhaust closed position, said exhaust pilot operator being energized prior to said supply pilot actuator in order to substantially negate internal cross-over leakage when said working fluid is to be admitted to said outlet.

16. A control valve according to claim 15 wherein said working fluid is a pressurized pneumatic working fluid.

17. A control valve according to claim 16 wherein said pneumatic working fluid is at a high pressure in the range of 300 psig to 900 psig and selectively adjustable at a low pressure in the range of 10 to 300 psig.

18. A control valve according to claim 17 wherein said pneumatic working fluid is at a pressure of approximately 600 psig.

19. A control valve according to claim 15 wherein said working fluid is a pressurized liquid working fluid.

20. A control valve according to claim 15 wherein said supply poppet is composed of a metallic material.

21. A control valve according to claim 20 wherein said metallic material includes stainless steel.

22. A control valve according to claim 15 wherein said supply poppet is composed of a synthetic material.

23. A control valve according to claim 15 wherein said supply poppet and said exhaust poppet are composed of a metallic material.

24. A control valve according to claim 23 wherein said metallic material includes stainless steel.

25. A control valve according to claim 15 wherein said supply poppet and said exhaust poppet are composed of a synthetic material.

26. A control valve according to claim 15 wherein said exhaust poppet is composed of a metallic material.

27. A control valve according to claim 26 wherein said metallic material includes stainless steel.

* * * * *